April 15, 1958     A. B. CLARK     2,830,639
CONTINUOUS TRACTION ANTI-SKID TIRE CHAIN
Filed May 27, 1954     2 Sheets-Sheet 1

Inventor
A. B. Clark
By Shoemaker & Mattare
ATTYS

April 15, 1958        A. B. CLARK        2,830,639
CONTINUOUS TRACTION ANTI-SKID TIRE CHAIN
Filed May 27, 1954        2 Sheets-Sheet 2

INVENTOR
A B Clark
BY *Shoemaker & Mattare*
ATTORNEYS

United States Patent Office 2,830,639
Patented Apr. 15, 1958

2,830,639

CONTINUOUS TRACTION ANTI-SKID TIRE CHAIN

Athol B. Clark, Amarillo, Tex.

Application May 27, 1954, Serial No. 432,672

5 Claims. (Cl. 152—239)

This invention relates to anti-skid chain for tires which may be referred to as a continuous traction anti-skid device.

The primary object of the invention is to provide an improved tire chain so constructed that it does not cause roughness or vibration when used as an anti-skid device on the tire of a motor vehicle on roads or streets made hazardous by ice, snow, or mud.

Another object of the invention is to provide an improved anti-skid device which provides continuous traction for both acceleration and deceleration on streets or roads made hazardous by ice, snow, or mud, and also providing traction in both lateral and longitudinal directions with respect to the vehicle.

Another object of the invention is to provide an improved tire chain which has perfect balance for high speed whereas chains of present construction inevitably effect a heavy area to the wheels at the point where ends of chains are connected with each other and cause the wheels to be unbalanced and produce vibrations which are liable to result in breakage at high speed.

Another object of the invention is to provide an improved tire chain which may be easily applied to or removed from a tire by a person standing or crouching next to a wheel of an automobile.

This improved anti-skid device has side chains which are disposed at inner and outer sides of a tire, an intermediate chain which extends about the tread of a tire, and transversely extending chains which extend between and are connected at their inner and outer ends with the tread chain and the side chains and so arranged that they exert pull upon the tread chain transversely thereof and cause it to follow a zig-zag path about the tread portion of a tire.

At the present time chains which are used for preventing a tire from skidding are somewhat similar to this improved chain, but they are of such formation that the inner and outer side chains must both have ends detachably connected with each other so that the anti-skid chain may be applied about or removed from a tire. This makes it necessary for a person who is applying an anti-skid chain to a tire to reach between the tire and portions of a mud guard in order to secure ends of an inner side chain together and often it is necessary to lie down on the ground or on a road covered with mud, snow, or ice while applying chains. This is very inconvenient as it is hard to reach ends of the inner side chain in order to connect them with each other and in addition a person applying or removing the tire chain is liable to soil his clothes with mud, slush, grease and other dirt.

Therefore, another object of the invention is to provide an anti-skid chain wherein the inner side chain consists of a continuous chain which may be readily passed about and across an inflated pneumatic tire to which the anti-skid chain is to be applied and assume such a position relative to the tire that the outer side chain and the tread chain may then be slid into proper positions and ends of the outer side chain then secured by fasteners which cause the outer chain to be of such a circumference that none of the chains can accidentally slip out of their proper positions about the tire.

Another object of the invention is to provide an anti-skid chain wherein the continuous inner chain extends circumferentially of the tire in a position slightly outwardly of the bulge or portion of a tire which is of the greatest thickness and thus prevent this inner chain from accidentally moving towards the axle and out of a position in which it is concentric with the tire when the sections forming the outer side chain are secured together.

Another object of the invention is to provide an anti-skid chain of this character wherein the outer side chain is formed of a plurality of sections which are detachably connected in end to end engagement with each other, the outer chain being then of a diameter slightly greater than the bead portion of the tire and of appreciably less diameter than the inner chain and thereby preventing the outer chain from having unintentional movements towards the tread portion of the tire and eliminating any likelihood of the anti-skid chain slipping out of its proper position about the tire.

Another object of the invention is to provide an anti-skid chain of this character wherein the intermediate tread chain is of such length and so connected with the inner and outer side chains that when the anti-skid chain is in place about a tire the tread chain will follow a zig-zag path entirely about the tire and at all times have portions of the tread chain and the transversely extending chains in contact with snow or ice on a muddy road along which an automobile is traveling and thus eliminate jars which would occur if portions of the anti-skid chain were not at all times between the tire and the surface of the road.

Another object of the invention is to provide an anti-skid chain so formed that it may be readily applied to or removed from a tire while the wheel is in place upon the axle of an automobile, the chains forming the anti-skid chain being so arranged that the anti-skid chain will be well balanced and the fasteners connecting sections of the outer side so disposed that centrifugal force will be reduced as much as possible when an automobile is in motion and its wheeling turning.

This improved anti-skid chain is illustrated in the accompanying drawings, wherein.

Figure 1:
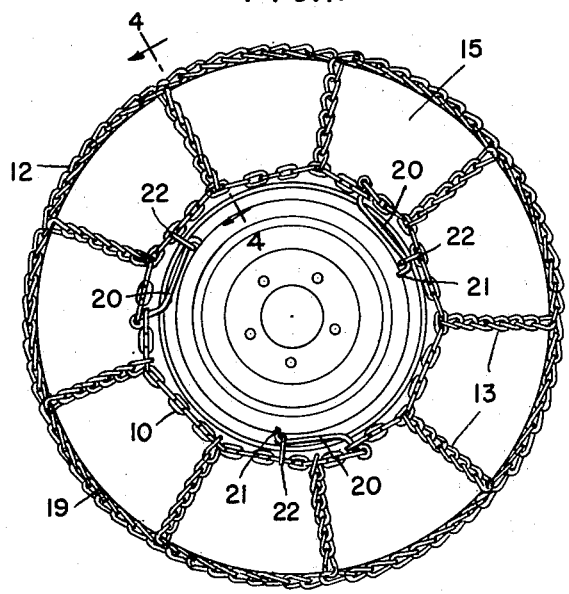
Fig. 1 is a view looking at the outer side of a wheel with the anti-skid chain in place about the tire.

This improved anti-skid chain or device for a tire consists briefly of an outer side chain 10, an inner side chain 11, an intermediate tread chain 12 and transverse chains 13 and 14 which extend between the side chains and the tread chain, the transverse chains connected with the outer side chain being in staggered relation to the transverse chains connected with the inner side chain and exerting pull upon the tread chain in such a manner that the tread chain will follow a zig-zag path entirely about the tread of the tire and have portions extending diagonally across the tread portion of the tire.

It is not necessary for the tread chain 12 to zig-zag to the full width of the tread of the tire, but in order for the device to have stability it is necessary that the tread chain 12 have approximately 10% greater length than the circumference of the tire and the width of the zig-zag is dependent upon the number of connecting chains 13 and 14. It is essential that the angular portions of chain 12 not extend outwardly beyond side edges of the tread portions of the tire. The extra length and resulting angularity of chain 12 is a critical issue or engineering feature of this device. Angles 23 must not be greater than approximately 120 degrees, although they may be more acute or less than 120 degrees, as otherwise chain 12 will lose stability of location relative to the tire tread and seek a position of smaller circumference, going off center toward the inside at one point and to the outside at another point. However, the interstition of connecting chains 13 and 14 must be close enough together so that the outer points of the zig-zags are within the tread area of the tire in order to effect the desired smooth ride.

The inner side chain 11 is a continuous chain which is preferably formed of twisted links, but it will be understood that other types of links may be used for this chain. This chain is flexible throughout its circumference and of such diameter that when the anti-skid device is in place about a tire 15 the inner side chain will be disposed circumferentially of the tire and slightly outwardly of the widest portion or bulge 16 of the tire. The reason for the large diameter and circumference of chain 11 is to facilitate application or removal as elsewhere explained; and the reason for the small diameter of chain 10 is to reduce speed and resulting centrifugal force upon the fasteners and loose chain ends wherein adjustments are made by dropping one or more links at each fastener. On the presently used tire chains such loose ends inevitably strike fenders or other parts of the automobile, but such will not occur in the improved chain.

Figure 4:
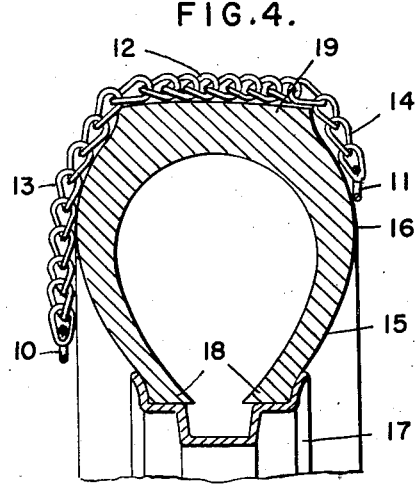
Fig. 4 is a sectional view upon an enlarged scale taken along the lines 4—4 of Fig. 1.
Figure 3:
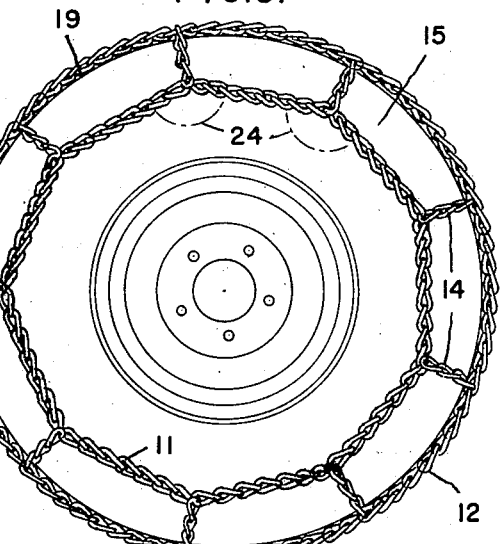
Fig. 3 is a view looking at the inner side of a wheel with the anti-skid chain in place about the tire.

The intermediate chain or tread chain 12 and the transversely extending chains 13 and 14 are also formed of twisted links of the type used for the inner side chain and it should be noted that the length of the chains 13 is somewhat longer than the length of the chains 14 so that when the anti-skid chain is in place about the tire the outer chain 10 will be disposed close to the rim and adjoining bead of the tire. This is clearly shown in Figs. 1 and 4 and by comparing these figures with Fig. 3 it will be seen that the inner side chain is of appreciably greater diameter than the outer side chain and also of appreciably less diameter than the diameter of the tread chain.

The outer side chain is formed of links which are free from twists and this outer side chain consists of three sections. It has been found that an outer side chain formed of three sections is most desirable but it will be understood that this number may be varied according to the size of the tire to which the anti-skid chain is to be applied. The sections forming the outer side chain have outer ends of the transverse chains 13 connected with them and each section has at one end a latch or hook 20 which is passed through a link at or adjacent an end of a section with which the section carrying the hook is to be connected.

Figure 5:
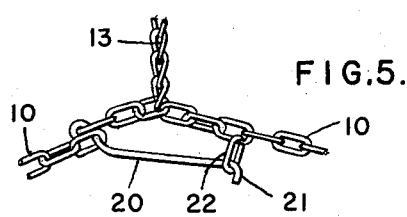
Fig. 5 is a fragmentary view showing a fastener by which end portions of sections forming the outer side chain are connected with each other.

After the hook has been passed through a link of a chain section which is to be secured to the chain section carrying the hook, the hook is swung to the position shown in Figs. 1 and 5 and its end which is formed with a bill 21 engaged through ring 22 spaced such a distance from the end of the chain section with which the hook or latch is connected that the end of the hook will be prevented from accidentally slipping out of its position in which it is engaged through the ring. It will be understood that other specific types of fasteners may be used instead of those illustrated and described.

Figure 2:
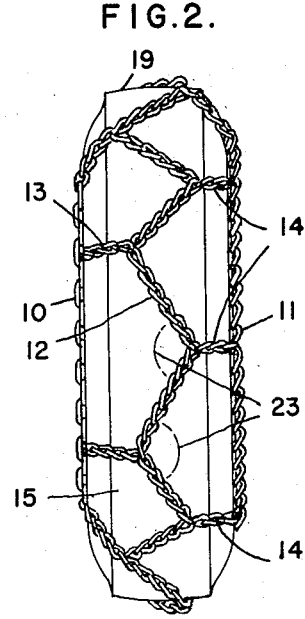
Fig. 2 is a view showing the anti-skid chain as it appears when looking at the tread of a tire.

The outer side chain then extends circumferentially of the tire near the rim and the outer bead of the tire and transverse pull will be exerted upon the tread chain by the transverse chains 13 and 14 and thus cause the tread chain to follow a zig-zag path entirely about the circumference of the tread portion 19 of the tire, as shown in Fig. 2. It should also be noted that the relation of the zig-zag portions of the tread chain to the transverse chains is such that a small angle indicated by the dotted line 23 in Fig. 2 is provided between meeting ends of the zig-zag portions of the tread chain. The inner transverse chains exert pull upon the inner side chain in spaced relation to each other circumferentially of the side chain and thus form the side chain with straight portions disposed in such angular relation to each other at their connection with the transverse chains that large angles indicated by the dotted lines 24 in Fig. 3 will be formed. This difference in the size of the large angles 24 and the small angles 23 causes the portions of the chains forming the angles to be in such relation to each other that a well balanced wheel is provided and the diagonally extending portions of the tread chain and adjoining portions of the transverse chains are so arranged about the tire that at all times portions of the chains will be disposed between the tread of the tire and the surface of a road along which an automobile is moving. This causes the automobile to ride smoothly and eliminates jolts which would occur if there were not at all times portions of the chains between the tires and the surface of the road. The fact that the outer side chain is close to the periphery of the rim of the wheel reduces centrifugal force created when the wheel is turning and ends of the hooks or latches 20 will be prevented from slipping out of the rings 22.

Figure 6:
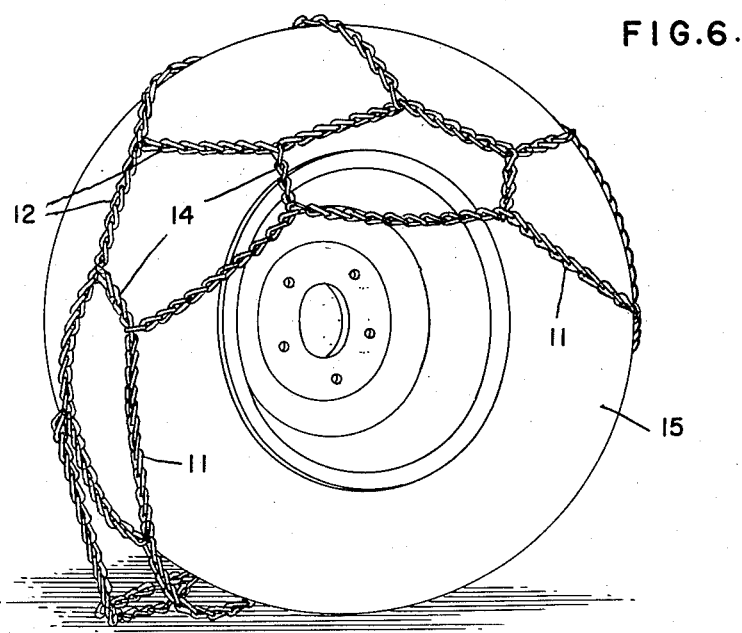
Fig. 6 is a perspective view showing the improved anti-skid chain partially applied to a tire.
Figure 7:
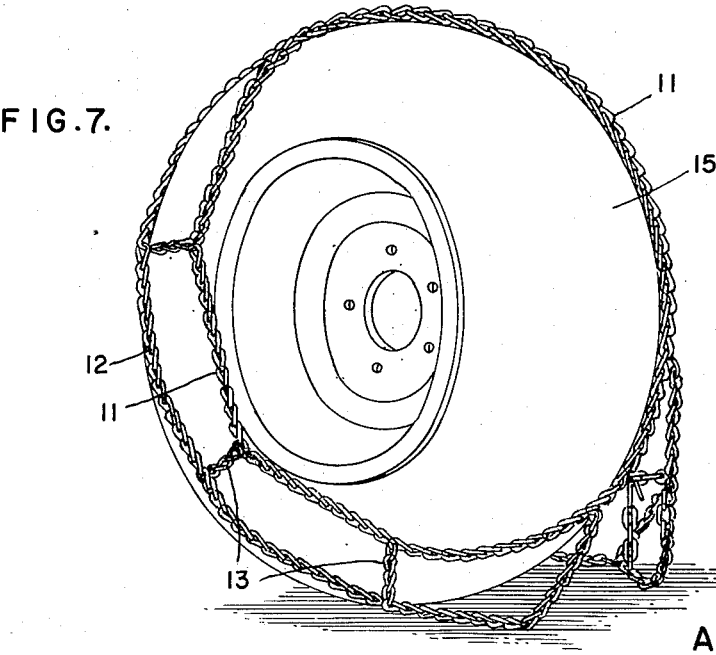
Fig. 7 is a perspective view showing the wheel turned a half turn from the position shown in Fig. 6 and in position for completion of application of the anti-skid chain to the tire.

When the improved anti-skid chain is to be applied to a tire, the axle or side portion of an automobile at which the tire is located is jacked up a sufficient distance to permit the wheel to be turned freely about its axle. The anti-skid chain is then draped about the upper portion of the tire with the side chain 11 disposed inwardly of the tire as shown in Fig. 6, it being understood that the operator stands or crouches near the outer side of the wheel. After the anti-skid chain has been draped about the upper portion of the tire as shown in Fig. 6, the wheel may then be given approximately a half turn to the position shown in Fig. 7, and the portion of the inner side chain which will then be resting upon the tread portion of the tire is forced across the tread portion of the tire with a person's hands, and the inner side chain will be moved to the position in which it is entirely disposed at the inner side of the tire. The flexibility of all of the chains, and particularly the flexibility of the continuous inner side chain, permits this action to take place. While it has been stated that the vehicle is jacked up a sufficient distance to permit the wheel to be turned freely, it will be understood that it is not necessary for the wheel to turn freely as it is sometimes necessary to apply the brakes so that the vehicle cannot roll down hill. It is also not necessary to turn the wheel a half turn after draping the chain over the top portion of the tire as the chain 11 will easily slide under the lower portion of the tire. After the inner side chain has been disposed at the inner side of the tire, the sections of the small outer side chain are drawn towards each other and the hooks or latches passed through links of the sections of the outer side chain and then engaged through the rings 22.

When the anti-skid chain is to be removed, it is merely necessary to reverse the steps outlined above, the hooks of the outer side chain being first released and pull exerted transversely of the tire to draw the inner side chain partially across the tire towards the outer side thereof and then allow the chain to drop upon the ground.

Instead of jacking up the wheel in order to apply the anti-skid chain to the tire, the chain may be draped over the upper portion of the tire, as in Fig. 6, and the automobile then moved forwardly or backwardly for approximately a half turn of its wheels and the remainder of the chain applied in the same manner as described above.

What is claimed is:

1. An anti-skid device for a tire comprising a continuous, circular inner side chain, a continuous, intermediate tread chain having a circumferential length of approximately 10% in excess of the circumference of the tread portion of a tire, a plurality of transverse chains connected at opposite ends to the inner side chain and the tread chain, said transverse chains being distributed in uniform circumferentially spaced relationship, an outer side chain assembly consisting of a plurality of separate chain sections, a plurality of transverse chains connected at opposite ends to said chain sections and the tread chain, the last mentioned transverse chains being uniformly, circumferentialy spaced and disposed in staggered relation to the first mentioned transverse chains, and means for detachably connecting said chain sections to each other at their adjacent ends, such that the outer side chain assembly, when connected together, is circular in form to cause the tread chain to follow a zig-zag path about the tread of a tire.

2. The chain according to claim 1 wherein said inner side chain is of less diameter than the diameter of the tread of the tire but is of greater diameter than the diameter of the widest portion of the tire, said outer side chain assembly, when connected, being of greater diameter than the diameter of the bead portion of the tire but less than the diameter of the tire at its widest portion.

3. An anti-skid device for a tire comprising an inner side chain, an outer side chain, an intermediate tread chain, and transverse links extending between the side chains and the tread chain in spaced relation to each other and with the transverse links at one side of the tread chain in staggered relation to the transverse links at the other side of the tread chain and causing the tread chain to follow a zig-zag path about the tread of a tire, one of the side chains being a large, continuous circular chain of less diameter than the diameter of the tread of a tire to which the anti-skid device is applied but of greater diameter than the diameter of the tire at its widest portion, the other side chain consisting of a plurality of separate chain sections detachably connected at their adjacent ends with each other and presenting, when connected together, a small circular composite chain of greater diameter than the diameter of the bead portion of the tire but appreciably less than the diameter of the tire at its widest portion.

4. An anti-skid device for a tire comprising an intermediate tread chain of a diameter adapting it to fit about the tread portion of a tire, an endless circular inner side chain smaller than the tread chain and of a diameter adapting it to extend about the inner side of the tire tread radially outwardly of the widest portion of the tire, a circular outer side chain smaller than the inner side chain and of a diameter slightly greater than the diameter of the bead portion of the tire, and transverse chains extending between the side chains and the tread chain and at the outer and inner ends thereof being connected with the side chains and the tread chain, the outer side chain consisting of a plurality of sections with which the transverse chains are permanently connected, and releasable fasteners detachably connecting adjacent ends of the said chain sections with each other and thereby producing an outer chain of desired diameter relative to the diameter of the tire.

5. An anti-skid device for a tire comprising an intermediate tread chain of a diameter adapting it to fit about the tread portion of a tire, an endless circular inner side chain smaller than the tread chain and of a diameter adapting it to extend about the inner side of the tire tread radially outwardly of the widest portion of the tire, a circular outer side chain smaller than the inner side chain and of a diameter slightly greater than the diameter of the bead portion of the tire, and transverse chains extending between the side chains and the tread chain and at the outer and inner ends thereof being connected with the side chains and the tread chain, the inner side chain being of large enough circumferential length to permit it to pass from the outer side to the inner side of the tire by flexation to an oval or elongated endless contour without removing the tire from the vehicle.

References Cited in the file of this patent

UNITED STATES PATENTS

| | | |
|---|---|---|
| 1,329,628 | Poorman | Feb. 3, 1920 |
| 1,783,872 | Doss | Dec. 2, 1930 |
| 2,222,393 | Benjamin | Nov. 19, 1940 |
| 2,415,583 | Eddy | Feb. 11, 1947 |
| 2,524,950 | Arey | Oct. 10, 1950 |

FOREIGN PATENTS

| | | |
|---|---|---|
| 73,914 | Sweden | Mar. 22, 1932 |